(12) United States Patent
Stoutenburgh et al.

(10) Patent No.: US 6,400,520 B1
(45) Date of Patent: Jun. 4, 2002

(54) DISC DRIVE HAVING A PREAMPLIFIER MULTIPLEXER

(75) Inventors: Joseph S. Stoutenburgh, Hopkins; Scott G. Sorrenson, Lakeville, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/177,161

(22) Filed: Oct. 22, 1998

Related U.S. Application Data

(60) Provisional application No. 60/062,755, filed on Oct. 23, 1997.

(51) Int. Cl.[7] ............................................. G11B 15/12
(52) U.S. Cl. ........................................... 360/63; 360/67
(58) Field of Search .............................. 360/66, 67, 61, 360/63, 65, 46; 330/124 R; 369/47.24, 53.37, 59.13

(56) References Cited

U.S. PATENT DOCUMENTS

| | | | | |
|---|---|---|---|---|
| 4,536,866 A | * | 8/1985 | Jerome et al. | 369/112.23 |
| 4,694,468 A | | 9/1987 | Cullum | 375/10 |
| 5,257,146 A | * | 10/1993 | Price, Jr. et al. | 360/67 |
| 5,352,987 A | * | 10/1994 | Harvey | 330/51 |
| 5,355,035 A | * | 10/1994 | Vora et al. | 307/494 |
| 5,367,409 A | | 11/1994 | Ottesen et al. | 360/32 |
| 5,488,518 A | * | 1/1996 | Shier | 360/67 |
| 5,528,379 A | * | 6/1996 | Bhang | 360/67 X |
| 5,543,979 A | * | 8/1996 | Davies | 360/67 |
| 5,638,226 A | | 6/1997 | Koren | 360/40 |
| 5,701,314 A | | 12/1997 | Armstrong et al. | 371/40.3 |
| 5,726,821 A | * | 3/1998 | Cloke et al. | 360/67 |
| 5,739,972 A | | 4/1998 | Smith | 360/77.03 |
| 5,862,014 A | * | 1/1999 | Nute | 360/261.1 X |
| 6,046,876 A | * | 4/2000 | Osafune et al. | 360/67 |

* cited by examiner

Primary Examiner—Andrew L. Sniezek
(74) Attorney, Agent, or Firm—Westman, Champlin & Kelly, P.A.

(57) ABSTRACT

A data storage system and device is provided in which parasitic capacitance between multiple preamplifiers and a signal channel is minimized. Multiple read signals from multiple data heads are amplified by corresponding ones of the multiple preamplifiers. A connection device coupled to each of the multiple preamplifiers selectively electrically couples the amplified read signal from the active preamplifier to the signal channel, while electrically isolating the amplified read signals from the inactive preamplifiers from the signal channel. In addition, a method of coupling multiple preamplifiers to a signal channel is provided.

20 Claims, 8 Drawing Sheets

DISC DRIVE HAVING A PREAMPLIFIER MULTIPLEXER

The present application claims the benefit of earlier filed U.S. Provisional Application Serial No. 60/062,755 filed Oct. 23, 1997, entitled PREAMPLIFIER MULTIPLEXER FOR DISC DRIVES.

BACKGROUND OF THE INVENTION

The present invention relates generally to disc drive data storage systems. More particularly, the present invention relates to circuits and methods for reducing parasitic capacitance on a common signal bus to which multiple preamplifiers are connected.

In disc drives and other data storage systems, digital data are written to and read from data storage surfaces. Read and write operations are performed through a transducer which is typically carried on a slider body. The slider and the transducer are sometimes collectively referred to as a head, and typically a single head is associated with each data storage surface. The transducer of a head provides a read back signal, indicative of the data read from the data storage surface, to a preamplifier circuit. After amplification by the preamplifier, the read back signal can be selectively provided to a channel integrated circuit (IC). The channel IC processes the read back signal and provides an output signal which is indicative of the data states of the individual bits in the read back signal data stream, and thereby of data stored on the data storage surface.

The channel IC, also referred to as the read/write channel or simply as the channel, is typically positioned on an electronic circuit card. The preamplifiers are typically connected to the channel using a flexible circuit assembly. A problem frequently occurs when there is more than one preamplifier in the data storage system. The analog read back signals from the preamplifiers are typically tied together to form a common signal bus which is connected to the channel. One common industry practice is to connect the outputs of the preamplifiers together at a location near the preamplifiers such that the flexible circuit assembly serves as the common signal bus. Another practice is to connect the outputs of the preamplifiers together on the electronic circuit card which carries the read/write channel. However, connecting the outputs of the preamplifiers together near the channel adds parasitic capacitance to the common signal bus, which reduces the bandwidth of the total circuit formed by the preamplifiers, signal bus and termination circuitry.

The present invention provides a solution to this and other problems, and offers other advantages over the prior art.

SUMMARY OF THE INVENTION

The present invention relates to data storage systems and apparatus, such as disc drive data storage systems, which include multiple preamplifiers coupled through a common signal bus to a signal channel device.

In accordance with one embodiment of the invention, a data storage system and device is provided in which parasitic capacitance between multiple preamplifiers and a signal channel is minimized. Multiple read signals from multiple data heads are amplified by corresponding ones of the multiple preamplifiers. A connection device coupled to each of the multiple preamplifiers selectively electrically couples the amplified read signal from the active preamplifier to the signal channel, while electrically isolating the amplified read signals from the inactive preamplifiers from the signal channel. In addition, a method of coupling multiple preamplifiers to a signal channel is provided.

These and various other features as well as advantages which characterize the present invention will be apparent upon reading of the following detailed description and review of the associated drawings.

DETAILED DESCRIPTION OF THE PREFERRED EMBODIMENTS

Figure 1:
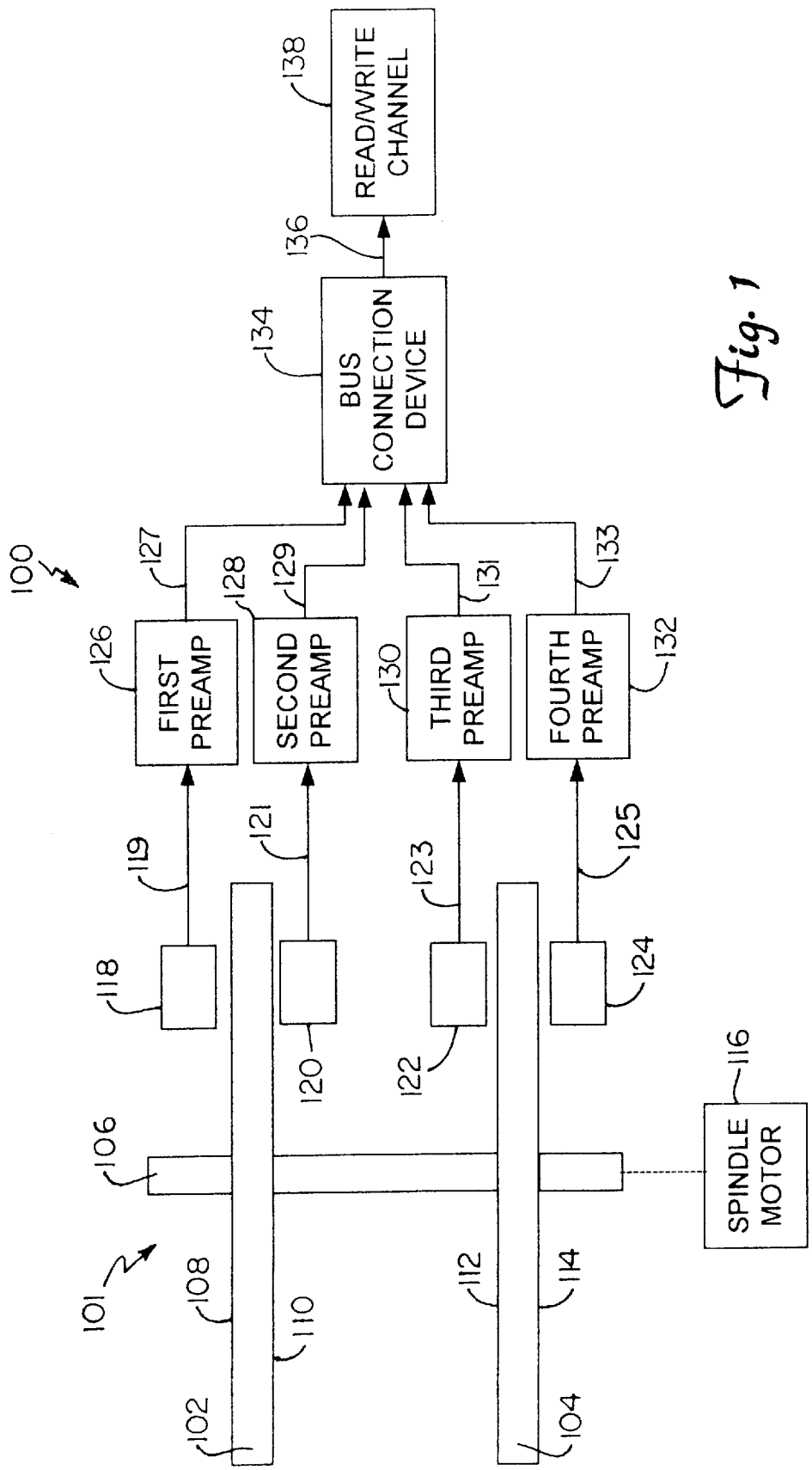
FIG. 1 is a block diagram illustrating a disc drive data storage system in accordance with the present invention.

Referring now to FIG. 1, data storage system or apparatus 100 is shown. Data storage system 100 includes disc stack 101 having data storage discs 102 and 104 mounted on spindle 106. Disc 102 provides data storage surfaces 108 and 110, while disc 104 provides data storage surfaces 112 and 114. Spindle motor 116 of system 100 is used to controllably rotate spindle 106 and discs 102 and 104. System 100 also includes data heads 118, 120, 122 and 124 positioned adjacent data storage surfaces 108, 110, 112 and 114, respectively. Data heads 118, 120, 122 and 124 provide read signal outputs 119, 121, 123 and 125, respectively, indicative of data read from the surfaces. First preamplifier 126 receives read signal 119, and provides as an output amplified read signal 127. Second preamplifier 128 receives read signal 121 as an input, and provides as an output amplified read signal 129. Third preamplifier 130 receives as an input read signal 123, and provides as an output amplified read signal 131. Fourth preamplifier 132 receives as an input read signal 125, and provides as an output amplified read signal 133.

Each of the amplified read signals are provided as inputs to bus connection device 134, which is in preferred embodiments a multiplexer. The output of bus connection device 134 is common signal bus 136. Common signal bus 136 is provided to read/write channel 138. Bus connection device 134 selectively electrically couples one of amplified read signals 127, 129, 131 and 133 to common signal bus 136 and channel 138, while electrically isolating the others of the amplified read signals from common signal bus 136 and channel 138. In doing so, bus connection device 134 minimizes parasitic capacitance on common signal bus 136, thereby increasing the bandwidth of the total circuit formed by the preamplifiers, signal bus and termination circuitry (termination circuitry not shown in FIG. 1).

Figure 2:
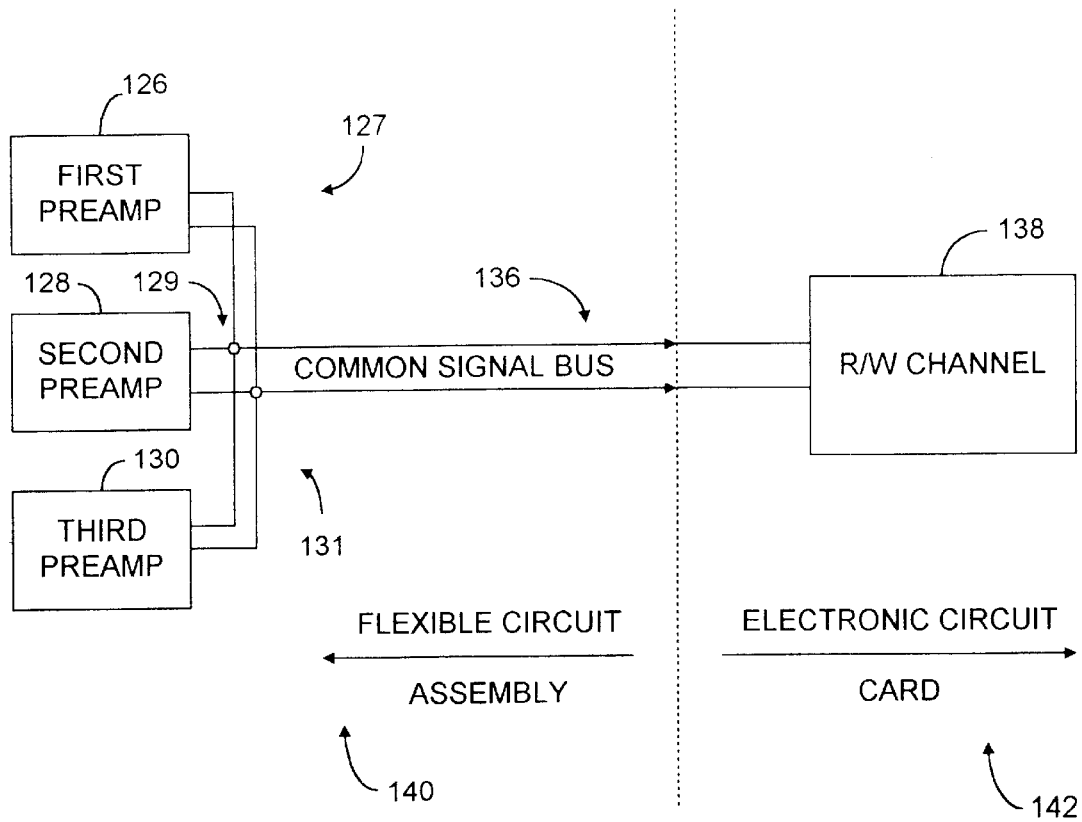
FIG. 2 is a block diagram illustrating a first prior art method of connecting multiple preamplifiers to a read/write channel.
Figure 3:
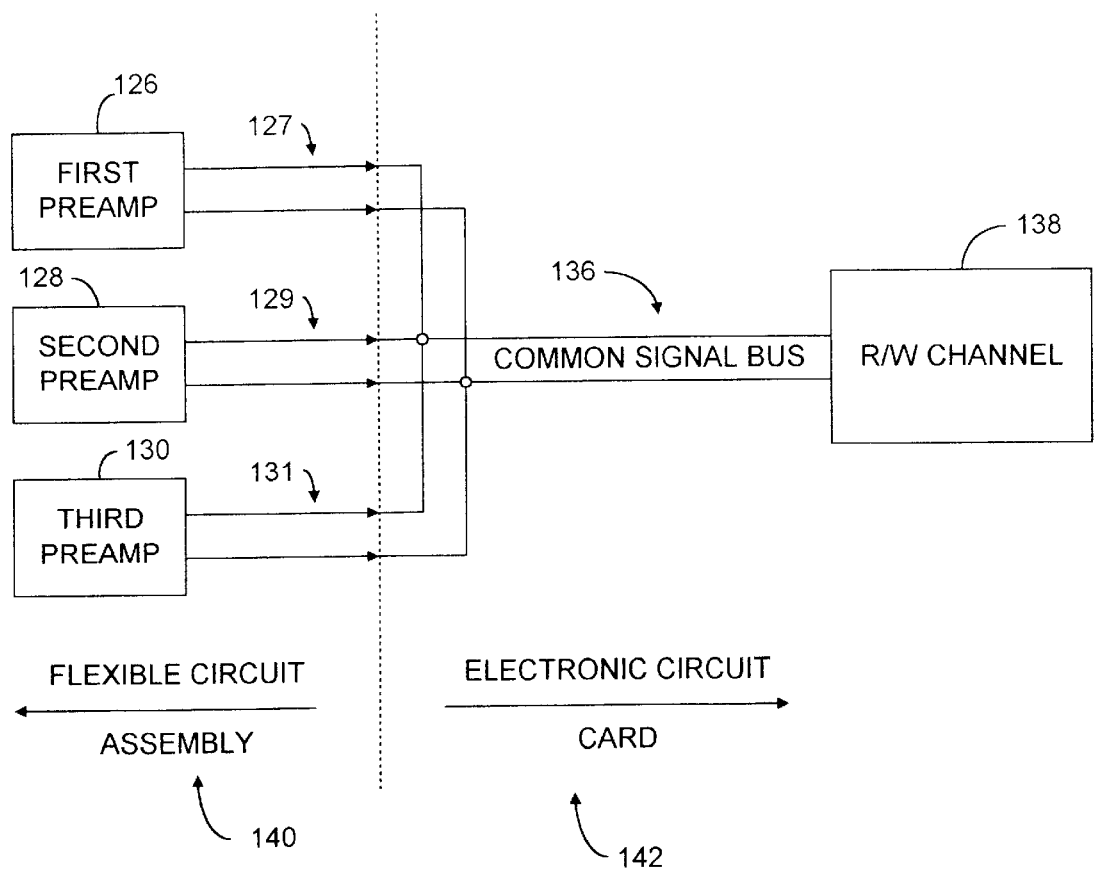
FIG. 3 is a block diagram illustrating a second prior art method of connecting multiple preamplifiers to a read/write channel.

FIGS. 2 and 3 illustrate two prior art methods of connecting multiple preamplifiers to a channel through a common signal bus. For ease of illustration, only three preamplifiers are illustrated. The prior art method shown in FIG. 3 of connecting the preamplifiers to the common signal bus and to the channel suffers from the adverse effects of parasitic capacitance.

As shown in the method illustrated in FIG. 2, amplified read signal 127, amplified read signal 129 and amplified read signal 131 are tied together to form common signal bus 136 entering channel 138. As is common in the industry, the analog amplified read signal outputs of the preamplifiers are tied together near preamplifiers 126, 128 and 130. Thus, common signal bus 136 extends on flexible circuit assembly 140. The integrated circuit (IC) of channel 138 is positioned on electronic circuit card 142.

Another common industry practice is illustrated in FIG. 3. As illustrated in FIG. 3, amplified read signal outputs 127, 129 and 131 are coupled together on electronic circuit card 142 to form common signal bus 136. Thus, common signal bus 136 lies entirely on electronic circuit card 142. Connecting outputs 127, 129 and 131 together near channel 138 also adds parasitic capacitance to common signal bus 136, which reduces the bandwidth of the total circuit formed by the preamplifiers, signal bus and termination circuitry. The termination circuitry not illustrated in FIGS. 2 and 3.

Figure 4:
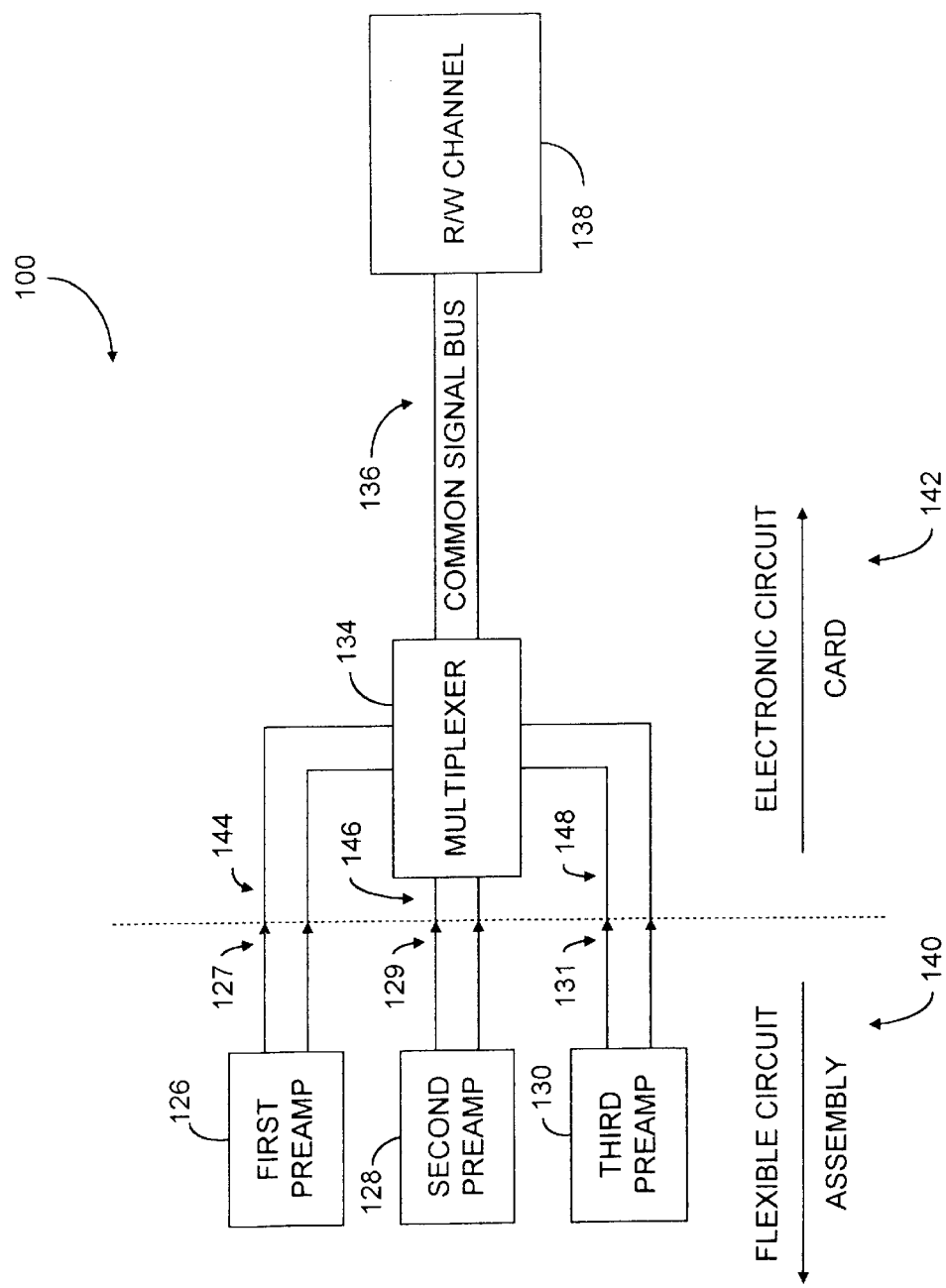
FIG. 4 is a block diagram illustrating an improved method of and circuit for connecting multiple preamplifiers to a read/write channel in accordance with embodiments of the present invention.

FIG. 4 is a block diagram illustrating a portion of data storage system 100 of the present invention in greater detail. As illustrated in FIG. 4, bus connection device 134 is preferably a multiplexer positioned on electronic circuit card 142 along with channel 138. Amplified read signal outputs 127, 129 and 131 from preamplifiers 126, 128 and 130, respectively, extend across flexible circuit assembly 140. Amplified read signal outputs 127, 129 and 131 are provided as inputs to multiplexer 134 via connections 144, 146 and 148, respectively, extending from flexible circuit assembly 140 across electronic circuit card 142. The output of multiplexer 134 forms common signal bus 136 extending from the multiplexer to channel 138. Multiplexer 134 allows each of preamplifiers 126, 128 and 130 to suffer minimum parasitic capacitance effects.

Figure 5:
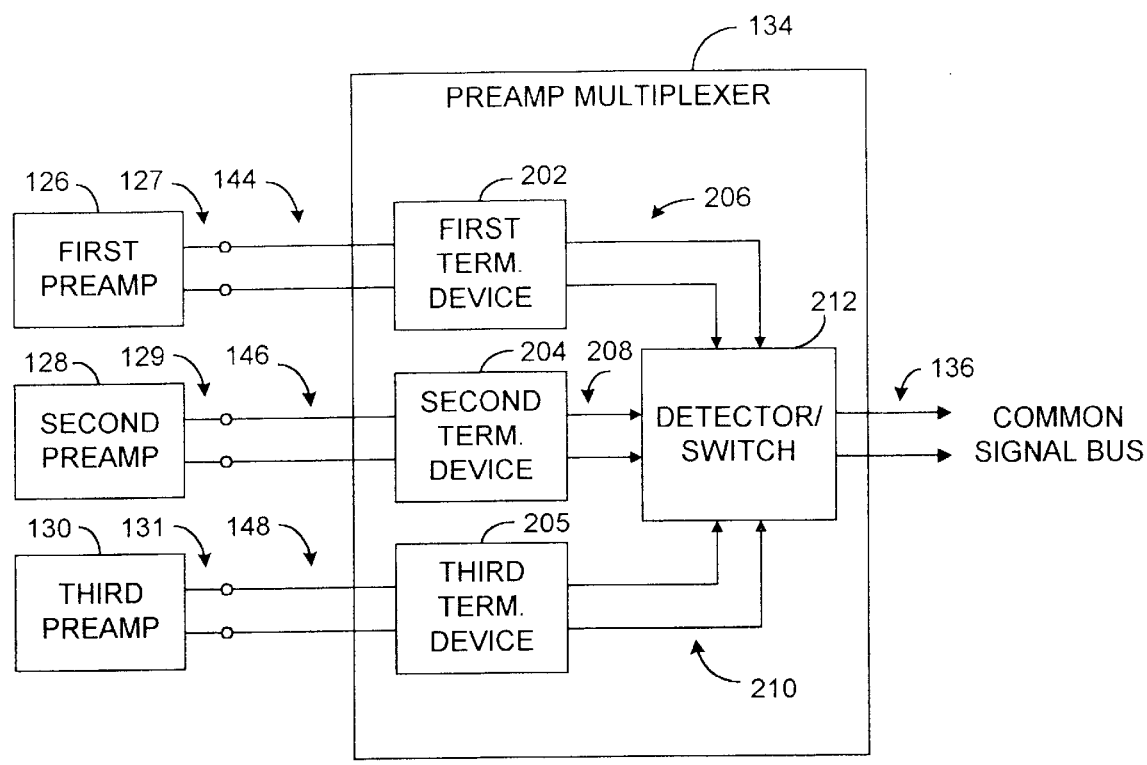
FIG. 5 is a block diagram illustrating the method and circuitry of FIG. 4 in greater detail.

FIG. 5 is a block diagram illustrating multiplexer 134 of system 100 in greater detail. As illustrated, multiplexer 134 receives at inputs 144, 146 and 148 amplified read signals 127, 129 and 131 from preamplifiers 126, 128 and 130, respectively. First termination device or network 202 receives amplified read signal 127 from input 144, and provides termination for first preamplifier 126 if amplifier 126 is inactive. As an output, first termination device 202 provides signal lines 206 to an input of detector/switch 212. Second termination device 204 receives amplified read signal 129 at input 146, and provides termination for second preamplifier 128 if the second preamplifier is inactive. As an output, second termination device 204 provides signal lines 208 to an input of detector/switch 212. Third termination device 205 receives amplified read signal 131 at input 148 and provides termination for third preamplifier 130 if third preamplifier 130 is inactive. As an output, third termination device 205 provides signal lines 210 to an input of detector/switch 212.

Detector/switch 212 detects, from signal lines 206, 208 and 210, which preamplifier is the active preamplifier. Detector/switch 212 then passes the active amplified read signal from its respective signal lines 206, 208 or 210 to common signal bus 136. Inclusion of multiplexer 134 as the bus connection device in system 100 provides several advantageous features. For example, the arrangement of components facilitates continuation of the preferred practice of connecting the outputs of the preamplifier together at the read/write channel end of the signal bus (i.e., on electronic circuit card 142). As data bandwidth increases in data storage systems, the need to minimize parasitic capacitance increases.

Another important feature of the present invention is the method used by multiplexer circuitry 134 to pass only the desired signal to common signal bus 136, while electrically isolating the other signal lines from the common signal bus. Typical analog signal multiplexers select a desired signal through some form of control logic which requires circuitry and firmware. Multiplexer 134 of the present invention uses the common mode output voltage driven from the low impedance output of the active preamplifier to turn on the desired multiplexer channel, without the need for any control logic or supporting firmware. The basic multiplexer circuit design can be extended to include any number or preamplifier channels. The multiplexer of the present invention also covers high impedance, current-mode signal buses. In this instance, the multiplexer senses common mode output current instead of common mode output voltage. The multiplexers of the present invention can also be adapted for differential and single ended preamplifier output structures.

Figure 6:
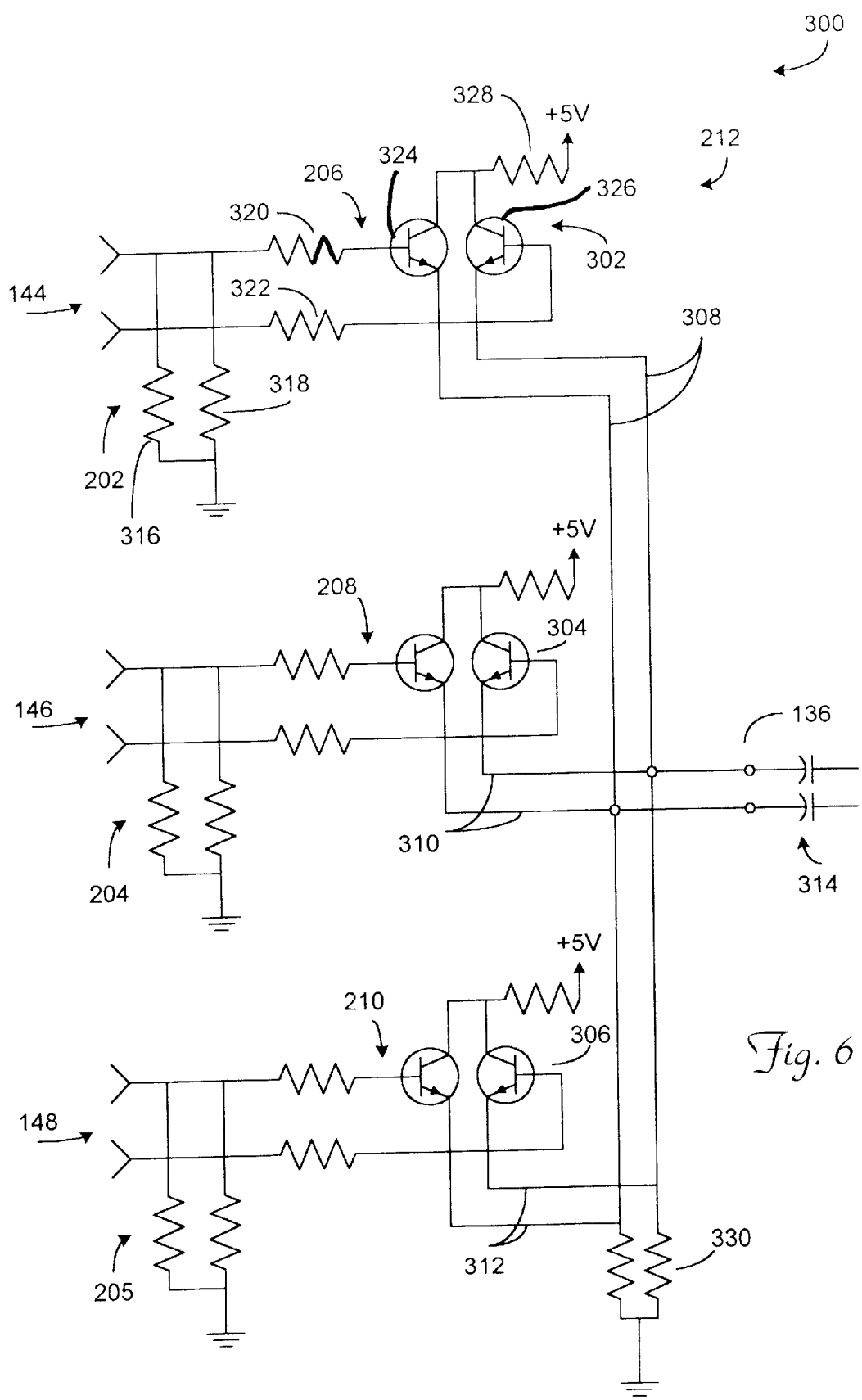
FIGS. 6–9 are schematic circuit diagrams illustrating various more particular embodiments of the circuitry illustrated in FIGS. 4 and 5.

FIG. 6 is a schematic illustration of multiplexer 300, which is one particular embodiment of multiplexer 134 illustrated in FIGS. 4 and 5. Multiplexer 300 includes termination resistor networks 202, 204 and 205 connected to inputs 144, 146 and 148, respectively. Signal lines 206, 208 and 210 are respectively provided as outputs from termination resistor networks 202, 204 and 206. Detector/switch device 212 includes differential pairs of transistors 302, 304 and 306. The outputs 308, 310 and 312 of differential transistor pairs 302, 304 and 306 are connected together to form common signal bus 136, which is coupled through capacitors 314 to channel 138 (not shown in FIG. 6). Since each of the termination resistor networks and differential pairs of transistors is preferably identical, only termination resistor network 202 and differential transistor pair 302 are discussed in detail.

Termination resistor network 202 includes resistors 316 and 318, each coupled between a different one of differential input lines 144 and ground. Differential transistor pair 302 includes transistors 324 and 326 having their collectors coupled to a voltage source through resistor 328. The emitters of transistors 324 and 326 are coupled to different ones of the lines of differential signal bus 136, and to ground through resistors 330. Circuit 300 also includes input resistors 320 and 322 coupled between termination network 202 and differential transistor pair 302. Depending on the preamplifier design, the preamplifier may assert no common mode voltage when it is inactive, or it may assert a common mode voltage from a high impedance source. With each differential signal pair 144, 146 and 148 connected through a resistor termination network to the bases of a differential transistor pair, the inactive preamplifiers may assert a voltage from a high impedance source. Consequently, with the impedance of the inactive preamplifiers being much greater than that of the corresponding resistor termination network, the output voltages from the inactive preamplifiers are dropped primarily across the high impedance sources, and the corresponding transistor bases have near zero voltages applied. Thus, the differential pairs of transistors coupled to the inactive preamplifiers are turned off. If the preamplifier is of the type that asserts no voltage when inactive, the differential pairs of transistors coupled to the inactive preamplifiers are turned off.

The active preamplifier asserts a common mode voltage from a source impedance which is much lower in resistance than the corresponding resistor termination network. Therefore, sufficient voltage bias is applied by the active preamplifier to the bases of the corresponding transistor pair. Thus, the differential pair of transistors corresponding to the active preamplifier is turned on. With the transistor emitters of the differential pairs tied together to form a common signal bus 136 at the circuit output, only the active transistor pair, driven by the active preamplifier, will pass a signal on to common signal bus 136. The parasitic capacitive load seen by the active preamplifier is limited to its own signal wires and the corresponding transistor bases.

Figure 7:
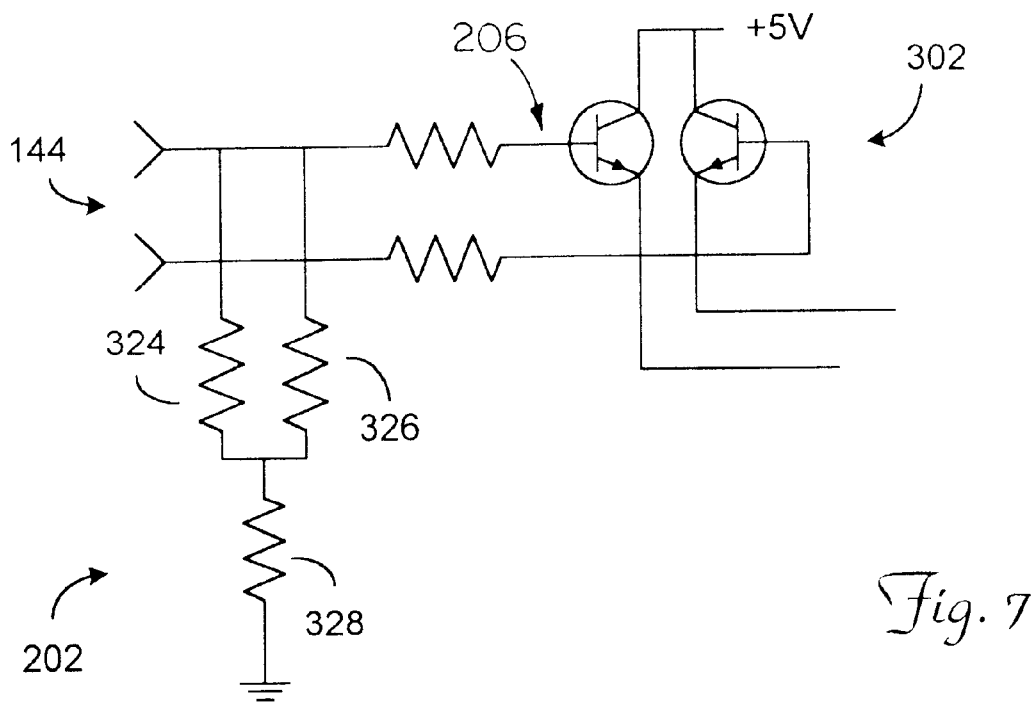

The present invention can utilize numerous different termination schemes for terminating the inactive preamplifiers. In FIG. 7, an embodiment is illustrated in which differential signal lines 144 carrying the amplified read signal from preamplifier 126 are terminated by an alternate embodiment of termination network 202 which minimizes ground noise in the signal. In the embodiment illustrated in FIG. 7, termination resistor network 202 includes "T" resistor configuration in which resistors 324 and 326 are coupled together at one end and to different ones of the differential signal lines 144 at the respective other ends. Resistor 328 is connected between ground and the connected ends of resistors 324 and 326.

Figure 8:
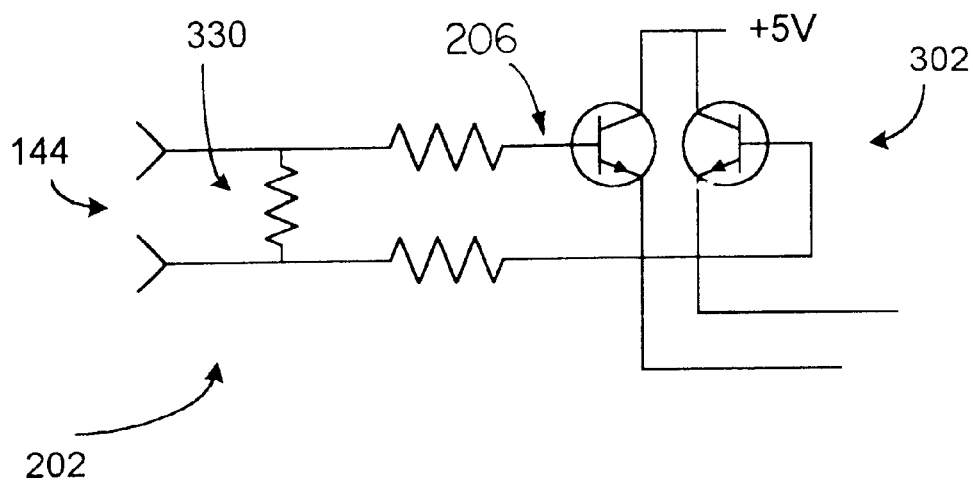

A simpler configuration of resistor termination network 202 is illustrated in FIG. 8 and can be used for preamplifiers that do not assert any common mode voltage at all when they are inactive. This embodiment can reduce component count by employing a single resistor 330 across differential signal lines 144.

Figure 9:
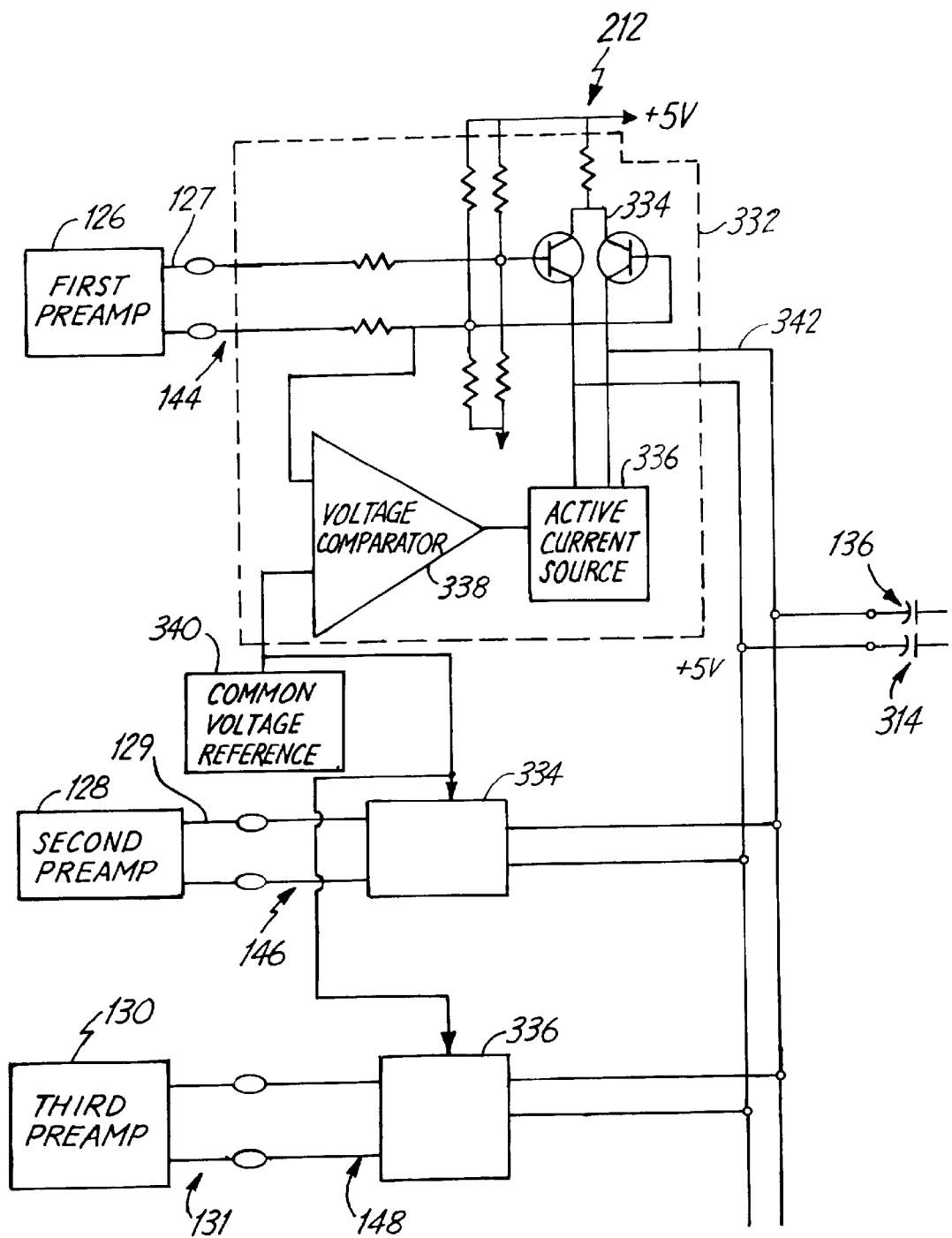

The present invention extends to embodiments other then those specifically illustrated. For example, the present invention includes any circuit used to couple preamplifiers to a read/write channel which depends upon the detection of the active preamplifier output to achieve the switching function. For example, FIG. 9 illustrates an embodiment of the present invention in which detector/switch circuitry 212 includes circuits 332, 334 and 336 coupled through inputs 144, 146 and 148 to preamplifiers 126, 128 and 130, respectively. Each of circuits 332, 334 and 336 is preferably identical. Therefore, only circuit 332 is described in detail.

Circuit 332 includes differential pair of transistors 334 receiving as inputs at the transistor bases the amplified read signal from first preamplifier 126. Circuit 332 also includes active current source 336 and voltage comparator 338. Common voltage source 340 provides an input to circuit 332, as well as to circuits 334 and 336. Voltage comparator 338 detects the preamplifier output level from input signal lines 144, and compares it to a reference voltage provided by common voltage reference 340. When the preamplifier output level exceeds the source voltage from common voltage reference 340, comparator 338 enables active current source 336 for transistor pair 334. Thus, the active amplified read signal is coupled by differential transistor pair 334 to output 342 and to signal bus 136. Generally, the embodiment shown in FIG. 9 is illustrative of circuits where the active preamplifier output is merely detected, and the switching circuitry has no dependence at all upon the voltage amplitude from the preamplifier for proper circuit operation.

The present invention can be summarized in reference to the FIGS., which illustrate data storage system or apparatus 100 and components thereof. The data storage system includes multiple data storage surfaces 108, 110 and 112. Data heads 118, 120 and 122 are each positioned adjacent a data storage surface, and are adapted to read data stored on the data storage surface and to provide a read signal in response. Each of multiple preamplifiers 126, 128 and 130 amplifies a corresponding one of the read signals. A connection device 134 is coupled to each of preamplifiers 126, 128 and 130 and to signal channel 138. Connection device 134 selectively electrically couples one of the amplified read signals to the signal channel, while electrically isolating the others of the multiple amplified read signals from the signal channel, to thereby minimize parasitic capacitance on each of the preamplifiers.

In embodiments of the present invention, connection device 134 is a multiplexer coupled to each of the preamplifiers and selectively electrically coupling the one of the amplified read signals to the signal channel while electrically isolating the others of the amplified read signals from the signal channel. In some embodiments, data storage system or device 100 includes circuit board 142, and the signal channel includes signal processing circuitry on the circuit board. In some embodiments, the multiplexer is positioned on the circuit board, and a flexible circuit 140 couples the preamplifiers to the multiplexer.

In some embodiments of data storage system 100, a common signal bus 136 couples an output of the multiplexer to the signal channel. The common signal bus is positioned on circuit board 142. In some embodiments, the multiplexer of connection device 134 includes termination circuitry 202, 204 and 205 adapted to terminate the amplified read signals.

In some embodiments, the. multiplexer includes multiple differential pairs of transistors. An input of each differential pair of transistors is operatively coupled to a different one of the preamplifiers. An output of each of the differential pairs of transistors is operatively coupled to the signal channel. Which of the differential pairs of transistors electrically couples its corresponding amplified read signal to the signal channel is determined as a function of the amplified read signals. In some embodiments, the amplified read signals are common mode output voltages of the plurality of preamplifiers.

In some embodiments of the present invention, connection device 134 includes a termination network 202, 204 and 205 operatively coupled to each of the preamplifiers and adapted to terminate each of the amplified read signals. Detection circuitry 212, 338 operatively coupled to each of the preamplifiers detects which of the preamplifiers is the active preamplifier. Switching circuitry 212 operatively coupled to each of the preamplifiers and to the detection circuitry electrically couples the active preamplifier and the corresponding amplified read signal to the signal channel, while electrically isolating the others of the preamplifiers and corresponding amplified read signals from the signal channel to thereby minimize parasitic capacitance.

Embodiments of the present invention include a method of coupling multiple preamplifiers 126, 128 and 130 to a signal channel 138 in a data storage device. The method includes detecting, from amplified read signals provided by each of the preamplifiers, which of the preamplifiers is an active preamplifier. A connection device 134, operatively coupled between each of the preamplifiers and the signal channel, is controlled to electrically couple the amplified read signal provided by the active preamplifier to the signal channel, while electrically isolating read signals provided by the other preamplifiers from the signal channel.

In some embodiments, controlling the connection device includes controlling a multiplexer, operatively coupled between each of the preamplifiers and the signal channel, to electrically couple the amplified read signal provided by the active preamplifier to the signal channel, while electrically isolating read signals provided by the other preamplifiers from the signal channel. The signal channel is in some embodiments positioned on circuit board 142, and controlling the multiplexer further includes providing the amplified read signal provided by the active preamplifier at a multiplexer output coupled to a common signal bus 136 which is positioned on the circuit board and which couples the multiplexer to the signal channel. In some embodiments, controlling the multiplexer to electrically isolate read signals provided by the other (non-active) preamplifiers from the signal channel further includes terminating the read signals provided by the non-active preamplifiers using termination circuitry.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In another example, the same functionality, in part or in whole may be integrated into a read/write channel or other integrated circuit device without departing from the scope and spirit of the present invention. In addition, although the preferred embodiment described herein is at times described as a disc drive data storage system, it will be appreciated by those skilled in the art that the teachings of the present invention can be applied to other systems and apparatus, such as optical storage systems, without departing from the scope and spirit of the present invention.

What is claimed is:

1. A data storage system comprising:
   a plurality of data heads each providing a read signal indicative of data stored on one of a plurality of data storage surfaces;
   a plurality of preamplifiers each operatively coupled to and receiving the read signal from one of the plurality of data heads and providing as a preamplifier output an amplified read signal;
   a signal channel; and
   a connection device coupled to each of the plurality of preamplifiers, the connection device including detection circuitry operatively coupled to each of the plurality of preamplifiers, the detection circuitry detecting which of the plurality of preamplifiers is an active preamplifier, the connection device electrically coupling the amplified read signal from the active preamplifier to the signal channel while electrically isolating the others of the amplified read signals from the signal channel to thereby minimize parasitic capacitance on each of the plurality of preamplifiers.

2. The data storage system of claim 1, wherein the connection device includes a multiplexer coupled to each of the plurality of preamplifiers and selectively electrically coupling one of the amplified read signals to the signal channel while electrically isolating the others of the amplified read signals from the signal channel.

3. The data storage system of claim 2, wherein the data storage device includes a circuit board, and wherein the signal channel includes signal processing circuitry on the circuit board.

4. The data storage system of claim 3, wherein the multiplexer is positioned on the circuit board, and wherein the data storage system further comprises a flexible circuit coupling the plurality of preamplifiers to the multiplexer.

5. The data storage system of claim 4, and further comprising a common signal bus coupling an output of the multiplexer to the signal channel, wherein the common signal bus is positioned on the circuit board.

6. The data storage system of claim 2, wherein the multiplexer further includes termination circuitry adapted to terminate the amplified read signals.

7. The data storage system of claim 6, wherein the multiplexer further includes a plurality of differential pairs of transistors, wherein an input of each differential pair of transistors is operatively coupled to a different one of the plurality of preamplifiers, and wherein an output of each of the plurality of differential pairs of transistors is operatively coupled to the signal channel.

8. The data storage device of claim 7, wherein which of the plurality of differential pairs of transistors electrically couples its corresponding amplified read signal to the signal channel is determined as a function of the amplified read signals from the plurality of preamplifiers.

9. The data storage system of claim 8, wherein the amplified read signals are carried on common mode output voltages of the plurality of preamplifiers.

10. The data storage device of claim 1, wherein the connection device further comprises:
    a termination network operatively coupled to each of the plurality of preamplifiers and adapted to terminate each of the amplified read signals; and
    switching circuitry operatively coupled to each of the plurality of preamplifiers and to the detection circuitry, the switching circuitry electrically coupling the active preamplifier and the corresponding amplified read signal to the signal channel, the switching circuitry electrically isolating the others of the plurality of preamplifiers and corresponding amplified read signals from the signal channel to thereby minimize parasitic capacitance.

11. A method of coupling a plurality of preamplifiers to a signal channel, the method comprising:
    detecting from amplified read signals provided by each of the plurality of preamplifiers which of the plurality of preamplifiers is an active preamplifier; and
    controlling a connection device operatively coupled between each of the plurality of preamplifiers and the signal channel to electrically couple the amplified read signal provided by the active preamplifier to the signal channel, while electrically isolating read signals provided by the others of the plurality of preamplifiers from the signal channel.

12. The method of claim 11, wherein controlling the connection device further comprises controlling a multiplexer, operatively coupled between each of the plurality of preamplifiers and the signal channel, to electrically couple the amplified read signal provided by the active preamplifier to the signal channel, while electrically isolating read signals provided by the others of the plurality of preamplifiers from the signal channel.

13. The method of claim 12, wherein the signal channel is positioned on a circuit board and wherein controlling the multiplexer further comprises providing the amplified read signal provided by the active preamplifier at a multiplexer output coupled to a common signal bus positioned on the circuit board and coupling the multiplexer to the signal channel.

14. The method of claim 12, wherein controlling the multiplexer to electrically isolate read signals provided by the other of the plurality of preamplifiers from the signal channel further comprises terminating the read signals provided by the other of the plurality of preamplifiers using termination circuitry.

15. A data storage device comprising:
a plurality of preamplifiers providing a plurality of amplified read signals;
a signal channel; and
connection means coupled between the plurality of preamplifiers and the signal channel for detecting from the plurality of amplified read signals which of the plurality of preamplifiers is an active preamplifier and for selectively electrically coupling one of the plurality of amplified read signals to the signal channel while electrically isolating the others of the plurality of amplified read signals from the signal channel.

16. A data storage device adapted to couple a plurality of preamplifiers to a signal channel, the data storage device comprising:
means for detecting from amplified read signals provided by each of the plurality of preamplifiers which of the plurality of preamplifiers is an active preamplifier; and
means for controlling a connection device operatively coupled between each of the plurality of preamplifiers and the signal channel to electrically couple the amplified read signal provided by the active preamplifier to the signal channel, while electrically isolating read signals provided by the others of the plurality of preamplifiers from the signal channel.

17. The data storage device of claim 16, wherein the connection device comprises a multiplexer.

18. The data storage device of claim 17, and further comprising termination circuitry configured to terminate the amplified read signals.

19. The data storage device of claim 18, wherein the multiplexer further includes a plurality of differential pairs of transistors, wherein an input of each differential pair of transistors is operatively coupled to a different one of the plurality of preamplifiers, and wherein an output of each of the plurality of differential pairs of transistors is operatively coupled to the signal channel.

20. The data storage device of claim 19, wherein which of the plurality of differential pairs of transistors electrically couples its corresponding amplified read signal to the signal channel is determined as a function of the amplified read signals from the plurality of preamplifiers.

* * * * *